United States Patent [19]

Morris et al.

[11] Patent Number: 6,032,033
[45] Date of Patent: Feb. 29, 2000

[54] PREAMBLE BASED SELECTION DIVERSITY IN A TIME DIVISION MULTIPLE ACCESS RADIO SYSTEM USING DIGITAL DEMODULATION

[75] Inventors: Bradley John Morris, Ottawa; David Gwyn Steer, Nepean, both of Canada

[73] Assignee: Nortel Networks Corporation, Montreal, Canada

[21] Appl. No.: 08/759,809

[22] Filed: Dec. 3, 1996

[51] Int. Cl.[7] .............................. H04B 1/06; H04B 7/212; H04Q 7/00

[52] U.S. Cl. ...................... 455/277.2; 455/273; 370/334; 370/347

[58] Field of Search ..................................... 370/252, 334, 370/337, 347; 455/273, 275, 277.1, 277.2, 562

[56] References Cited

U.S. PATENT DOCUMENTS

| | | | |
|---|---|---|---|
| 4,977,616 | 12/1990 | Linder et al. | 455/277.2 |
| 5,097,484 | 3/1992 | Akaiwa | 375/267 |
| 5,203,024 | 4/1993 | Yamao | 455/133 |
| 5,369,801 | 11/1994 | Smith | 455/277.1 |
| 5,446,922 | 8/1995 | Siwiak et al. | 455/277.2 |
| 5,724,666 | 3/1998 | Dent | 455/562 |
| 5,884,178 | 3/1999 | Ericsson et al. | 455/441 |

FOREIGN PATENT DOCUMENTS

| | | |
|---|---|---|
| WO9602984 | 2/1996 | WIPO . |
| WO9608089 | 3/1996 | WIPO . |

*Primary Examiner*—Michael Horabik
*Assistant Examiner*—Kevin L. Harper

[57] ABSTRACT

A selection diversity system and method for use in a TDMA (time division multiple access) radio system, particularly suited for DECT (Digital Enhanced Cordless Telephone) or PWT (personal wireless telephony) applications. A digitized version of a received signal is buffered long enough to allow selection diversity measurements to occur without corrupting the demodulation of the desired signal. While the received signal is being buffered, a single receiver makes a performance measurement on each of two antennas in sequence during the beginning of a received data burst, the beginning of the burst being determined by a timing signal fed back from a previous burst. The previously unused antenna is measured first to minimize the likelihood of having to perform two antenna switches. Also while the received signal is buffered, timing recovery and frequency offset correction are performed.

30 Claims, 5 Drawing Sheets

PREAMBLE BASED SELECTION DIVERSITY IN A TIME DIVISION MULTIPLE ACCESS RADIO SYSTEM USING DIGITAL DEMODULATION

FIELD OF THE INVENTION

The invention relates to a method and system for performing selection diversity in a TDMA (time division multiple access) radio system.

BACKGROUND OF THE INVENTION

Cordless telephone TDMA radio systems include a number of fixed base stations and a set of portable handsets (portables). The portables communicate digital data to and from the base stations on TDMA radio channels. In TDMA, each base station receives data from a given portable in short bursts followed by intervening periods during which no data is received. During the intervening periods, the base station may be communicating with other portables.

It is well known that TDMA radio channels are subject to the impairment of multipath fading. Such fading is statistically independent for a pair of properly spaced antennas at a base station receiver for example. At any instant in time, one of the two antennas may be performing better than the other, and ideally a signal should be received through the better performing antenna. During the period between the reception of bursts on a particular channel, the physical channel between the portable and the base station may change as a result of the movement of the portable itself, or as a result of the movement of some other object. As a result of this, it is possible that the antenna which was better for the previous burst is no longer the better for the current burst. With selection diversity, at the beginning of each burst a decision is made as to which antenna is to be used to receive that entire burst.

Standards exist which stipulate the data structure of a TDMA burst. In the DECT (Digital Enhanced Cordless Telecommunications) standard for example, GMSK (Gaussian minimum shift keying) is used to transmit bursts having a structure which includes a set of preamble bits used for timing recovery and a sync word used for slot synchronization. Following the sync word are the information bits. With selection diversity, in order to properly recover the information bits of a given burst, a decision as to which antenna to use for that burst must be made early enough in the reception of the burst that timing and synchronization can still be recovered before the information bits start to arrive. Another TDMA standard is the PWT (personal wireless telephony) standard. PWT is the North American variant of DECT, and utilizes $\pi/4$ DQPSK modulation instead of GMSK.

One way to make the antenna selection decision is to have two receivers receiving the signal simultaneously, each receiver having its own antenna. Performance measurements for the two receivers are made simultaneously and the receiver output which is better is selected.

A much more economical approach is to use a single receiver having two alternatively connectable antennas and to perform both antenna measurements one after the other and then choose the better antenna for the remainder of the signal. Typically, in order to determine which antenna to use, the first antenna is connected early in the reception of the burst and an estimate of the performance is made for that antenna. Then the second antenna is connected and an estimate of the performance is made for that antenna. If the second antenna is performing better than the first antenna then the second antenna is used to receive the burst. Otherwise, the first antenna must be reconnected to receive the remainder of the burst.

A problem with existing TDMA systems is that there is not enough time to make the performance measurements for the two antennas, decide on which antenna to use, recover timing, and recover synchronization before the information bits start to arrive.

Some prior art patents simply neglect to deal with this problem. Published PCT application WO 96/08089 published on Jun. 27, 1995 to Mogensen discloses a selection diversity system for use in a TDMA environment in which the quality of the signal received at the receiver on each of two antenna branches is measured at the beginning of each burst, and the antenna with the better quality is selected. No mention is made of the requirement to recover timing and synchronization. In Mogensen, it is conceded that some of the data will be lost because of the antenna measurements, this lost data being recovered through the use of interleaving and efficient coding. This system is not applicable to DECT or PWT systems as they do not employ interleaving or coding.

Published PCT application WO 96/02984 published on Feb. 1, 1996 to Akerberg discloses a method of selecting a given antenna in a TDMA system by making antenna performance measurements during the preamble period of a DECT TDMA time slot. By using up the preamble bits to make the performance measurements, there is a shortened period during which to recover timing and synchronization. Akerberg does not address the problems of recovering the timing and synchronization of the signal before the arrival of the information bits.

In a recent modification of the DECT standard, an optional extended preamble is added which provides 16 extra bits to the beginning of each time slot during which the performance measurements of two antennas can be made. This leaves the normal preamble and sync words available for the recovery of timing and synchronization. A problem with this is that a different data format at the portable must be used, and thus existing portables which do not provide the extended preamble can not be used to provide selection diversity at the base station.

SUMMARY OF THE INVENTION

It is an object of the invention to provide an improved preamble based selection diversity method and apparatus.

According to a first broad aspect, the invention provides a TDMA (time division multiple access) radio receiver for receiving data bursts each having a plurality of symbols divided into a preamble, a sync word and a data field, the receiver comprising: a) a plurality of alternatively connectable antenna channels; b) digital demodulation means for digitally demodulating the received data burst before recovery of the sync word; c) sync word detection means for searching for the sync word in a demodulated bit stream and generating an indication that the sync word has been received in a previous burst; d) timing means for measuring forward in time from reception of the sync word of the previous burst to provide an estimate of the beginning of the preamble of a present burst; e) selection means for controlling which of the plurality of antenna channels is connected and for making performance measurements, the selection means connecting the plurality of antenna channels in turn and making a performance measurement for each antenna channel and after all the performance measurements are made the selection means connecting to the receiver the antenna channel with the best performance measurement, the first performance measurement being made during a period having a start time related to the estimate of the beginning of the preamble of the present burst.

According to a second broad aspect, the invention provides a TDMA (time division multiple access) radio receiver for receiving data bursts each having a plurality of symbols divided into a preamble, a sync word and a data field, the receiver comprising: a) a plurality of alternatively connectable antenna channels; b) selection means for controlling which of the plurality of antenna channels is connected and for making performance measurements, the selection means connecting the plurality of antenna channels in turn and making a performance measurement for each antenna channel and after all the performance measurements are made the selection means connecting to the receiver the antenna channel with the best performance measurement, the first performance measurement being made during a period having a start time related to the estimate of the beginning of the preamble of the present burst; c) analog to digital converter means for making M digital samples of each symbol, each digital sample containing N bits, where M>0, and N>0; d) digital demodulation means for digitally demodulating selected digital samples of the received data burst; e) timing recovery means for selecting the selected digital samples which represent received symbols; and f) storage buffer means connected to an output of the analog-to-digital converter means, the shift register means being large enough to delay all the digital samples of the received burst just long enough to allow antenna selection to be completed without corrupting the demodulation of the sync word.

According to a third broad aspect, the invention provides an antenna channel selection method for use in a TDMA radio receiver having first and second alternatively connectable antenna channels for receiving data bursts each having a plurality of symbols divided into a preamble, a sync word and a data field, the antenna channel selection method comprising the steps of: a) determining when a sync word for a previous burst has been received; b) measuring forward in time from the reception of the sync word of a previous burst to provide an estimate of the beginning of the preamble of a present burst; c) connecting the first antenna; d) measuring a first performance measurement for the first antenna channel during a first time interval having a start time related to the estimate of the beginning of the preamble of the present burst; e) connecting the second antenna channel during a second time interval following said first time interval; f) measuring a second performance measurement for the second antenna channel during a third time interval following said second time interval; g) comparing the first performance measurement and the second performance measurement to determine which performance measurement is better; and h) reconnecting the first antenna channel if the first performance measurement is better.

An advantage of the method and apparatus provided by the invention is that they can be employed at DECT TDMA base stations without the requirement for any modification to the portables.

The use of selection diversity results in the further advantages of enhanced base station coverage and better call quality.

BRIEF DESCRIPTION OF THE DRAWINGS

Preferred embodiments of the invention will now be described with reference to the attached drawings in which:

FIG. 3 is a block diagram of a selection diversity receiver according to the invention;

DETAILED DESCRIPTION OF THE PREFERRED EMBODIMENTS

Figure 1:
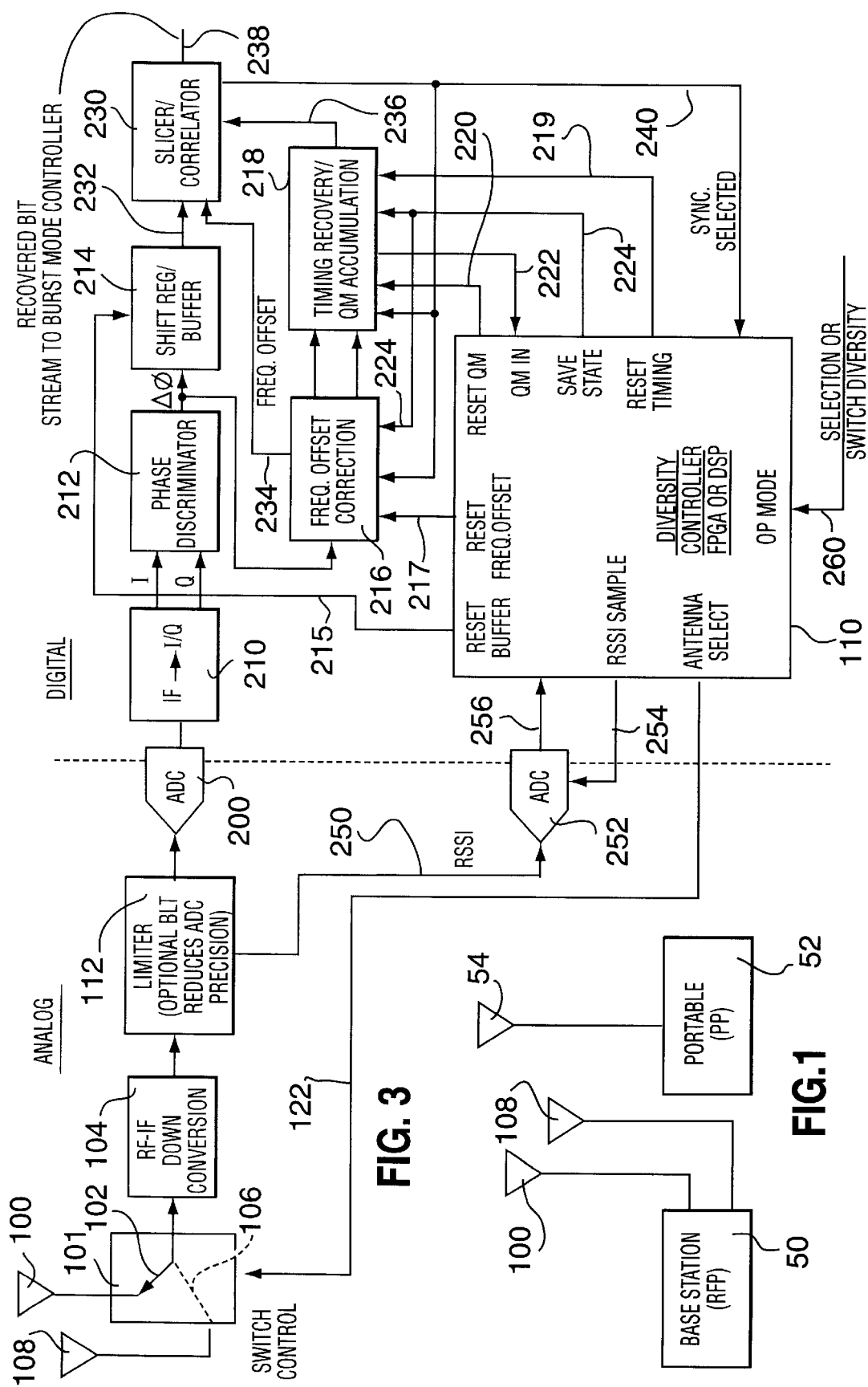
FIG. 1 is a schematic diagram of a cordless telephone system.

FIG. 1 is a very simple schematic of a cordless telephone system. Shown is an RFP (radio fixed part) such as a base station 50 having two antennas 100,108 and a PP (portable or portable part) 52 having an antenna 54. A real system would normally have a large number of base stations and an even larger number of portables. Signals are transmitted from the portable antenna 54 through a multipath radio channel to the base station antennas 100,108. The signals arriving at the antennas 100,108 suffer attenuation and dispersion due to multipath fading. The physical separation of antennas 100,108 is selected so that the fading characteristics of the two antennas are statistically independent. This means that if the signal arriving at antenna 100 is in a deep fade, there is a significant statistical likelihood that the signal arriving at antenna 108 is relatively strong.

Figure 2:
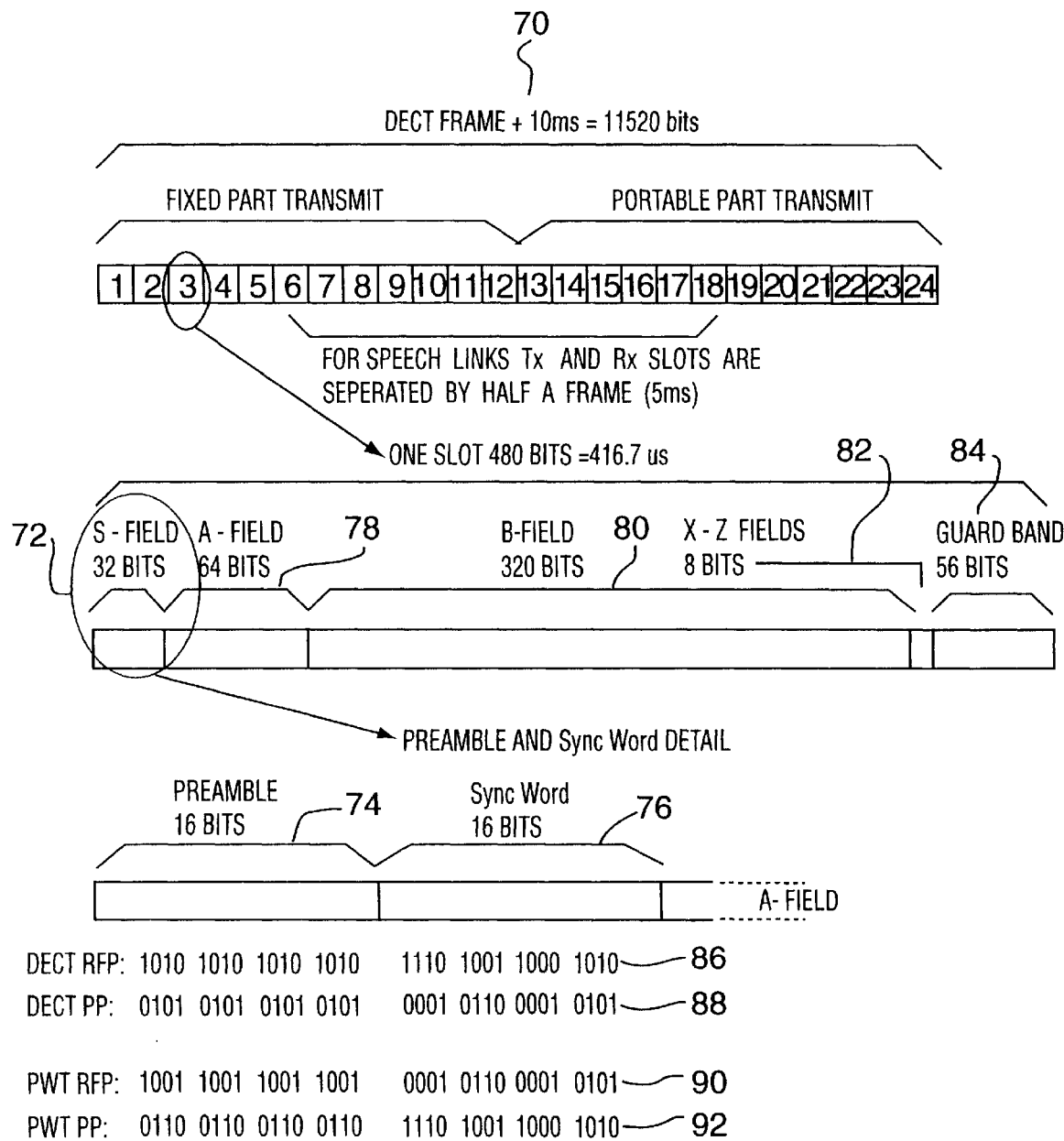
FIG. 2 is an illustration of the DECT TDMA frame and slot structure.

A preferred embodiment of the invention will be described as it may be applied to a DECT system with reference to FIGS. 2 to 6. Referring firstly to FIG. 2, the DECT radio access technology uses a multi-carrier TDMA/TDD (time division duplex) structure. A DECT TDMA frame 70 has a duration of 10 ms and contains 24 full slots numbered 1 to 24. The TDD separation is half a frame (5 ms); thus during slots 1 to 12 the base station is transmitting to the portables, and during slots 13 to 24, the base station is receiving from the portables. One duplex channel is made up of a transmit slot and a receive slot spaced twelve slots (5 ms) later. Also shown is the structure of the data burst contained in each slot. This includes an S-field 72 consisting of a 16 bit preamble 74 normally used for timing recovery and a 16 bit Sync word 76 normally used for synchronization recovery, a 64 bit A-field 78, a 320 bit B-field 80 containing information bits, 8 bits 82 occupying X and Z fields, and a 56 bit guard band 84 which simply separates adjacent slots. The A-field 78 usually includes CRC (cyclic redundancy check) information which can be used to obtain a measurement of the quality of the received burst. The modulation scheme is binary GMSK (Gaussian minimum shift keying) (BT=0.5) with a gross data rate of 1.152 Mbit/s. The allocated frequency band for DECT is 1880–1900 MHZ divided into 10 carriers. The transmitted symbols are GMSK symbols which consist of two tones nominally spaced in frequency 288 kHz on either side of the carrier frequency of a given channel, the actual frequency deviation varying with the data sent. Since the system is a binary one, each GMSK symbol carries a single bit of information.

Also shown are the particular bit sequences which make up the S-field according to DECT for the RFP 86 and PP 88 and the particular bit sequences making up the S-field according to PWT for the RFP 90 and PP 92.

Referring now to FIG. 3, the structure of a digital TDMA base station receiver according to the invention will be described. A first antenna 100 is shown connected through a switch 101 having a first position 102 to an RF-IF (radio frequency—intermediate frequency) frequency conversion block 104 which performs frequency down conversion and channel filtering. When the switch 101 is in a second position 106, a second antenna 108 is connected to the RF-IF downconversion block 104. A diversity controller circuit 110 which may for example be implemented with a FPGA (field programmable gate array) or a DSP (digital signal processor) controls through a switch control line 122 the switch 101 connecting the antennas 100,108 to the RF-IF frequency converter block 104 thereby selecting the antenna through which to receive a signal. Following the RF-IF frequency down conversion block 104 is a limiter 112 an output of which is connected to an ADC (analog to digital converter) 200. This is followed by a digital quadrature mixer (IF→I/Q) 210 and a digital phase discriminator 212. The digital phase discriminator 212 is connected to a shift register/buffer 214 and a frequency offset correction circuit 216.

The shift register/buffer 214 contains storage locations for 16 symbols worth of data. Preferably, an OSR (oversampling rate) of 8 is employed, meaning that 8 digital samples per symbol are taken, each of which has a 5 bit digital resolution. This requires (16 symbols)×(OSR=8)= 128 memory locations each of which holds a 5 bit digital sample. A reset buffer line 215 connects the diversity controller 110 to the shift register/buffer 214 for conducting a "reset buffer" signal.

An output of the frequency offset correction circuit 216 is connected to a timing recovery/QM (quality metric) accumulation block 218. A reset frequency offset line 217 connects the diversity controller 110 to the frequency offset correction circuit 216 for conducting a "reset frequency offset" signal. A reset timing line 219 connects the diversity controller 110 to the timing recovery/QM accumulation block 218 to conduct a "reset timing" signal. A reset QM line 220 also connects the diversity controller 110 to the timing recover/QM accumulation block 218 to conduct a "reset QM" signal. A line 222 carries a QM signal output by the timing recover/QM accumulation block 218 to an input of the diversity controller 110. A pair of save state lines 224 connect the diversity controller 110 to both the frequency offset correction circuit 216 and the timing recovery/QM accumulation block 218 to conduct a "save state" signal.

A slicer/correlator circuit 230 is connected to receive a time shifted sample stream output from the shift register 214 on line 232, a frequency offset correction from the frequency offset correction circuit 216 on line 234 and a sample strobe from the timing recover/QM accumulation block 218 on line 236. The slicer in the slicer/correlator block 236 performs digital threshold detection on the buffered discriminator output Δφ to produce a recovered bit stream which is then processed by the correlator in the slicer/correlator block to produce a "SYNC DETECTED" signal. The slicer/correlator circuit 230 has an output line 238 connected to a BMC (burst mode controller) (not shown) for carrying a demodulated bit stream, and has an output line 240 for conducting the "SYNC DETECTED" signal as discussed in detail further below. The BMC demultiplexes the demodulated bit stream.

A line 250 connects the limiter 112 to a second ADC 252 to conduct a continuous RSSI (received signal strength indicator) formed by the limiter 112. The diversity controller 110 controls when the ADC 252 samples the RSSI with RSSI sample control line 254. A digital output 256 of the ADC 252 is connected to the diversity controller 110.

A mode select line 260 connects a microcontroller (not shown) to the diversity controller 110 for conducting "mode select" signal which controls whether selection or switch diversity is used.

Referring again to FIG. 2, while a link between a portable and a base station exists, one of the 24 TDMA slots is assigned for transmission to the portable, and a slot twelve slots after the transmission slot is assigned for reception from the portable. For example, slots 11 and 23 may be assigned as the transmit slot and receive slot respectively. Approximately every 10 ms, another burst arrives at the base station receiver in slot 23 in the next frame. The invention is concerned with the selection of which of the two antennas 100,108 to use to receive each burst. The base station also uses the previously selected receive antenna to transmit the next burst.

Figure 5A:
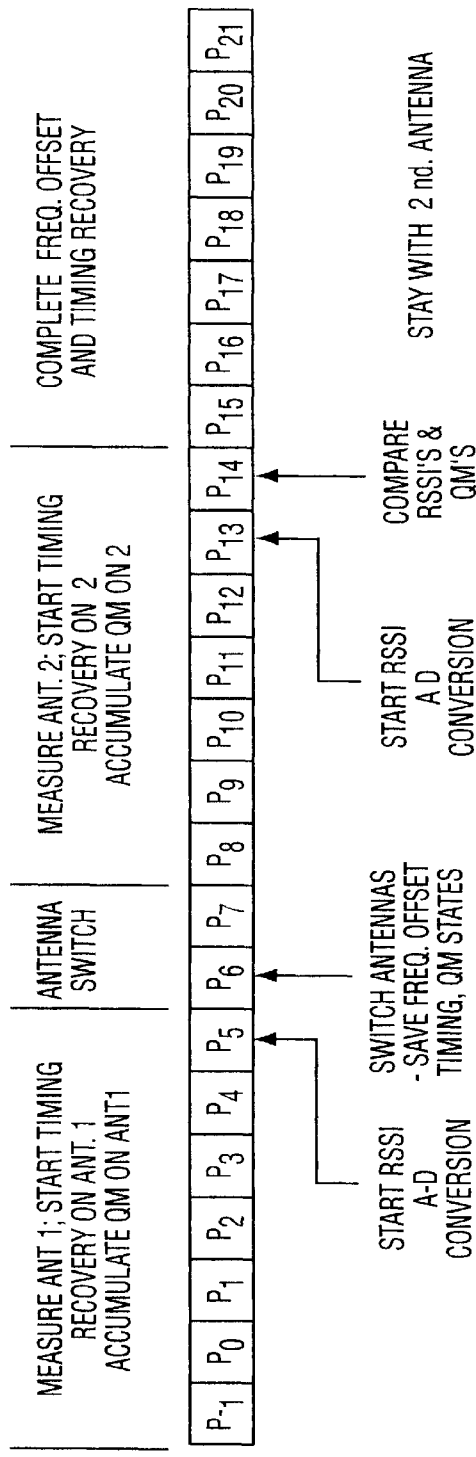
FIGS. 5a and 5b are illustrations of how the preamble bit periods are used to perform selection diversity functions.
Figure 5B:
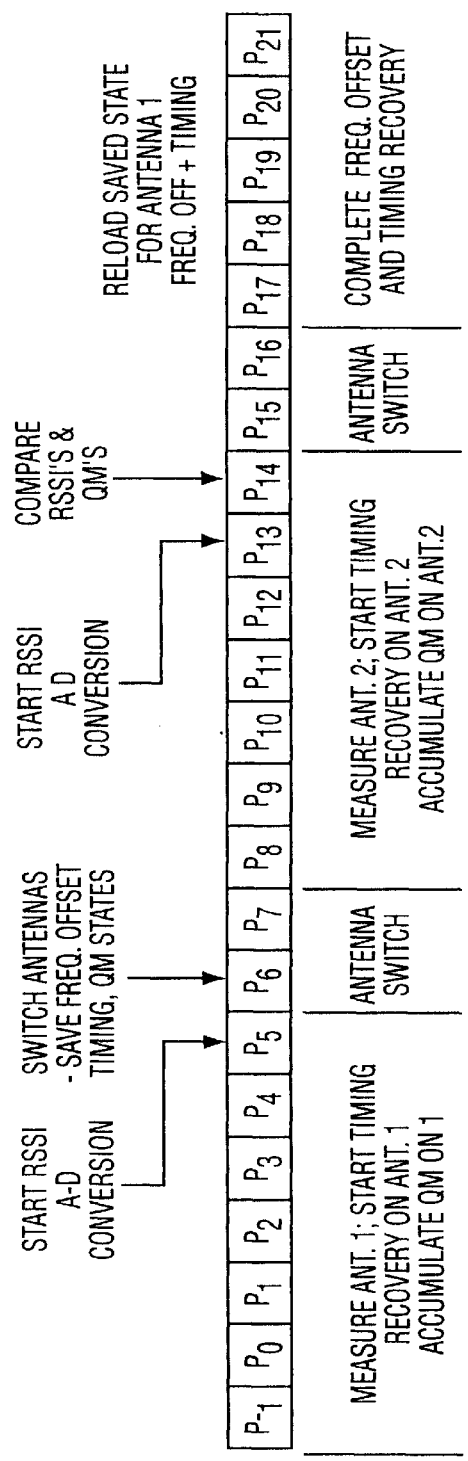

The first GMSK symbols in a DECT burst to arrive at the receiver are the symbols for the preamble bits. The DECT standard constrains the preamble bits to be an alternating sequence of 1's and 0's, this pattern being particularly suitable for timing recovery. FIGS. 5a and 5b illustrate the preamble symbol periods and how they are used during selection diversity according to the invention. Following the preamble is the sync word and then the remainder of the burst. The precise breakdown of the bits in the preamble shown is by way of example only. The exact number of bits used for each function may be changed based upon need and requirement without departing from the scope of the invention.

Assume that the RF carrier frequency of the channel of interest is $F_c$, so that the GMSK tones are nominally located at $F_c-288$ kHz and $F_c+288$ kHz. Due to the tolerance in the base station and portable, the base station transmitted carrier frequency $F_{c,tx,RFP}$ is in the range $F_c \pm 50$ kHz, and the portable transmitted carrier frequency $F_{c,tx,pp}$ is in the range of either $F_c \pm 50$ kHz, or $F_{c,tx,RFP} \pm 50$ kHz. This results in the received carrier frequency at either the portable or base station being accurate to within +/−100 kHz. Received GMSK tones are down converted and filtered in the RF-IF frequency converter 104 and are fed into the limiter 112. The limiter amplifies and then clips the received IF signal to be a constant amplitude (there is no information in the amplitude). This reduces the dynamic range requirement of the ADC 200 used to sample the IF signal, thereby allowing fewer bits of resolution to be used to represent the analog signals. The limiter output voltage is fed into ADC 200 which samples the voltage eight times per symbol and produces a five bit digital representation of each sample of the voltage. The output of the ADC is fed into the digital quadrature mixer 210 which produces I and Q phase signals. The phase discriminator 212 produces a discrimination output signal Δφ which is equal to the difference between the phase of the current I/Q signals and that of one sample earlier. Sixteen symbols worth of digital Δφ data (16 symbols×8 samples×5 bits) are fed into the shift register 214. The shift register 214 is long enough to hold 16 symbols or 14 μs worth of data, this being the length of the sync word. More generally, the shift register 214 must be long enough to delay the demodulation of samples for the duration of the selection diversity processing so that no bits of the sync word are corrupted or lost thereby ensuring reliable slot synchronization.

The phase discriminator 212 output Δφ is also fed into the frequency offset correction block 216 which calculates any frequency offset component of the signal which is due to an error in the carrier frequency.

The slicer/correlator 230 samples the output of the shift register 214 once per symbol interval at a time determined by the sample strobe signal generated by the timing recovery/QM accumulation block 218. The sample is then corrected by the frequency offset signal generated by the frequency offset correction block 216. The slicer 230 converts the samples into either a high signal or a low signal on the basis of a fixed threshold, thereby producing a series of bits at the slicer output 238, these being the receiver's estimate of the data transmitted to the base station. These bits are then passed to the BMC (not shown) where the demodulated bit stream is demultiplexed.

In order to determine which antenna to use for the burst being received, during the preamble the diversity controller 110 enables with control line 254 the capture of an RSSI (received signal strength indication) for the signal received through each antenna in turn, and selects the antenna with the better measurement in conjunction with a digital quality metric produced by the timing recovery/QM accumulation block 218. How this is achieved will now be described in detail with particular reference to FIG. 3.

The diversity controller 110 must first determine when to start measuring the RSSI of the first antenna 100. This is equivalent to making an estimate of when the preamble begins. Although the time between data bursts on a given channel is nominally 10 ms, there is some variation in this value, and the arrival time of the beginning of the preamble is not deterministic. From one burst to the next, a switch to a base station which is a different distance from the portable may have occurred resulting in a delay if the new base station is further away. The portable itself may also have moved. If the beginning of the preamble could be determined exactly, then the entire length of the preamble, namely 14 $\mu$s for DECT, would be available to perform the selection diversity functions and timing recovery. However, a +/-2.0 $\mu$s tolerance must be allotted in the portable, and another +/-2 $\mu$s tolerance for the difference between base stations for a total tolerance of +/-4 $\mu$s. Thus, the start of the preamble is somewhere in the range of $t_o$+/-4.0 $\mu$s as the worst case tolerance required between an individual portable and base station, where $t_o$ is the nominal start time. A given base station supports many portables, 12 in the case of DECT, one for each channel consisting of a transmit and receive slot pair. Effective RSSI measurements do not begin unless there is power, i.e. the burst has started to be received. If the RSSI measurement is started early at $t_o$-4 $\mu$s to catch the beginning of the earliest possible burst, and if a burst actually arrives 4 $\mu$s late at $t_o$+4 $\mu$s then the 8 $\mu$s between $t_o$-4 $\mu$s and $t_o$+4 $\mu$s is spent making an invalid set of measurements, since there is no signal to measure. If instead, the measurement is started 4 $\mu$s late at $t_o$+4 $\mu$s to ensure there is power at the start of the measurement, then if a burst actually arrives 4 $\mu$s early at $t_o$-4 $\mu$s then 8 $\mu$s of the preamble is wasted waiting for the measurement to begin. In either case, only 6 $\mu$s of the 14 $\mu$s preamble remains to perform the two antenna RSSI measurements, any necessary switching, and timing recovery. This is insufficient time to perform all of these functions. To overcome this, a feedback signal on line 240 from the slicer/correlator 230 is used. The correlator function in the slicer/correlator 230 scans the demodulated bit sequence produced by the slicer for a subsequence which matches the sync word. The purpose of locating the sync word is to determine where in the incoming bit stream the A-field 78 is located. When the slicer/correlator 230 locates the sync word, it generates a SYNC DETECTED feedback signal on line 240 indicating that synchronization has been detected. This SYNC DETECTED signal indicates the end of the sync word has been received, thereby locating in time the beginning of the A-field 78.

Since the incoming signal is buffered in the shift register/buffer 214 for 14 $\mu$s, the SYNC DETECTED signal is actually generated 14 $\mu$s after the sync word has been physically received. The SYNC DETECTED signal is fed back to the FPGA 110 on line 240 and is used to make an estimate of the start of the preamble of the next received slot and to thereby determine when to enable the sampling of the RSSI measurements. After the SYNC DETECTED signal is received by the diversity controller 110 over line 240, the diversity controller measures forward in time from the end of the sync word to the beginning of the next burst for the slot of interest contained in the next frame, and begins the first RSSI measurement at the end of the measured time. This amount of time is nominally the length of a frame (10 ms) less the length of the preamble and sync word (28 $\mu$s) less the delay introduced by the shift register 214 (14 $\mu$s). Thus it is the SYNC DETECTED signal from the previous burst which is used to determine when to start sampling RSSI measurements on the subsequent burst. This has been found to result in approximately a 0 to ±1 $\mu$s variation or jitter in the start time. So as not to miss the start of the burst this ±1 $\mu$s jitter is accounted for by subtracting 1 $\mu$s from the estimate of the start of the preamble. This does not ensure power at the start of the burst but does guarantee at least 12 $\mu$s to perform the required measurements. Note that the jitter is typically quite stable because the range of movement over 10 ms is small and therefore does not have a large effect upon the timing, so that feedback of sync information from a previous burst is applicable to the present burst. Because the tolerances are stable, it is possible to further reduce burst jitter by calculating the mean value of the jitter, with the microcontroller for example. This may be done by computing the difference between the actual start of the burst and the estimate of the start of the burst and averaging this difference over several bursts. The actual start of the burst would be determined later in the reception of the burst by measuring backwards from the time synchronization is achieved for example. The estimate of the start of the preamble of subsequent bursts can then be improved by adding this mean value to the estimate. This would increase slightly the amount of time to perform the selection diversity functions.

Feedback from the previous burst can only be accomplished if there was a previous burst. To determine when to measure the very first burst, various approaches or diversity modes may be employed while the call is being setup. In the example illustrated, the diversity mode is selected by a mode select signal on line 260 generated by the microcontroller (not shown). The microcontroller instructs the diversity controller to perform switch diversity during call setup, disabling the selection diversity function during that time. With switch diversity, an attempt is first made at receiving a slot with an arbitrary antenna. If this is unsuccessful then a switch to the other antenna is made. Once a slot is successfully received on either antenna, a switch to selection diversity is made. The microcontroller is used to set up the diversity mode for each slot in the frame. It does this by setting registers in the diversity controller to select the mode of operation. It is not necessary for the microcontroller to interact with the diversity controller on every slot. It only needs to be involved when changes are required to a specific slot's mode of operation.

After an estimate has been made of when the preamble begins, the receiver can proceed with making the RSSI performance measurements. To start, the diversity controller 110 through line 122 instructs switch 101 to connect the first antenna 100 to receiver block 104. During approximately the first six symbol periods of the preamble (4.5 us), the timing recovery/QM accumulation block 218 accumulates a quality metric for the first antenna. At the end of this time, the accumulated quality metric for the first antenna is saved through line 222. Also at the end of this time, the diversity controller 110 through line 254 instructs the ADC 252 to capture an ADC RSSI measurement for the first antenna 100. This is stored by the diversity controller 110 for later use. The first antenna is selected approximately one symbol interval before the estimated start time of the preamble to account for the +/−1 μs tolerance in the estimate. This ensures that if the burst arrives 1 μs early, the measurement includes the start of the burst. However, the six symbol intervals allotted for the first antenna may include two empty symbol intervals if the burst actually arrives 1 μs late. This leaves four symbol intervals to perform the measurement, and this is sufficient. During approximately the next two preamble symbol periods, the diversity controller instructs the switch 101 through line 122 to switch to its second switch position 106 so as to connect the second antenna 108 to receiver block 104, and transients are allowed to decay. During approximately the next six symbol periods, a digital quality metric is accumulated for the second antenna. At the end of this period, another ADC RSSI measurement is captured by signalling the ADC 252 through line 254. The stored digital RSSI sample for the first antenna and the digital sample for the second antenna are compared digitally in the diversity controller 110. If the measurement for the first antenna is greater than that for the second antenna by a predetermined amount (to offset for improved timing recovery in the second antenna) then the first antenna is selected as being better. If the two digital RSSI measurements differ by less than a predetermined amount, then a comparison of the digital quality metric accumulated for each antenna is made. The antenna having the better digital quality metric may be used, thereby overriding the decision based upon the RSSI measurements. As soon as an antenna is selected, a switch back to the first antenna 100 is made only if the first antenna was selected as being better.

In interference limited environments, the RSSI metric does not yield good performance. This is why a second quality metric consisting of the digital quality metric is used in these circumstances. The digital quality metric is produced by the timing recovery/QM accumulation block 218 by digitally processing the frequency offset corrected $\Delta\phi$ samples. Various combinations of the digital quality metric and the analog metric may be used to select which antenna to use. In the above described example, the digital metric is used when the difference between the RSSI measurements for the two antennas is below a presettable threshold.

During the reception of the preamble, the timing recovery/QM accumulation block 218 must recover the timing of the signal. The function of timing recovery is to locate timewise each symbol contained in the received signal. Each symbol is sampled eight times per symbol and timing recovery consists of determining which of the eight samples is in the middle of the symbol, this being the optimal sample to use in subsequent threshold detection by the slicer/correlator circuit 230.

By buffering the received digitally converted $\Delta\phi$ information in the shift register 214, timing recovery can be completed on the sync word prior to slicing the sync word, thereby assuring accurate timing when demodulating the sync word and increasing the chance that it is detected properly. While the RSSI measurements are being made, the phase discriminated samples taken of the preamble symbols are shifting into the shift register 214. After the preamble has been completely received the entire phase discriminated preamble is in the shift register 214 and the shift register is full. At the same time, the digitally sampled preamble passes through the frequency offset correction block 216 and the timing recovery/QM accumulation block 218. During the reception of the first six symbols, the timing recovery/QM accumulation block 218 begins to perform timing recovery for the first antenna. Since each symbol has been sampled eight times, proper timing consists of knowing which of the eight samples corresponds to the centre of the symbol. The timing recovery/QM accumulation block 218 compiles a histogram with eight bins of the magnitudes of an eight sample window of data. The first histogram statistic is a sum of the first sample and every eighth sample thereafter. The second histogram statistic is the sum of the second sample and every eighth sample thereafter, and so on up until the eighth histogram statistic which is the sum of the eighth sample and every eighth sample thereafter. It can be determined that the sample having the largest cumulative histogram statistic is the best estimate of the received sample. This best sample may be located anywhere within the eight sample window.

During the first six symbols, histogram data is compiled for the first antenna. As a starting point in the frequency offset estimation process the frequency offset estimated during the previous slot may be used. During the same period, the frequency offset correction circuit 216 develops a frequency offset signal for use with the first antenna. After six symbols, the timing histogram data and the frequency offset for the first antenna are stored in memory. After this, two symbol intervals are taken to switch to the second antenna. It is important that the timing histogram and the frequency offset information for the first antenna be stored before the switching transient caused by switching to the second antenna reaches the timing circuit in order to avoid corrupting the information being saved. The peak value of the timing histogram is used as the digital quality metric for the first antenna, and this is forwarded to the diversity controller 110 through line 222. During the next six symbol intervals, a second RSSI measurement is made, and timing recovery is started by the timing recovery/QM accumulation block 218 by compiling a second histogram for the second antenna. A second frequency offset is developed for the second antenna. The peak value of the histogram for the second antenna is used as the digital quality metric for the second antenna. After both RSSI measurements have been made, a decision as to which antenna to use is made, and if necessary a switch back to the first antenna is made. If such a switch is made, again two symbol intervals are spent switching back to the first antenna, and this time is not available for timing recovery. The previously stored histogram and frequency offset are recalled after the switching transient has settled. It is important that the histogram and frequency offset for the first antenna is recalled an integral multiple of eight sample intervals after it was stored to ensure that the timing information for the eight sample window is aligned. If no switch is made then the remaining two symbols of the preamble are available to continue compiling the timing histogram for the second antenna.

After the preamble has shifted through the shift register, the shift register contains the digitized sync word. While the sync word is shifting into the shift register 214, the timing recovery/QM accumulation block 218 continues to compile the timing histogram for the selected antenna. The output of the shift register 214 is sampled by a sampler in the slicer/correlator circuit 230 at times determined by when a sample strobe on line 236 is generated by the timing recovery/QM accumulation block 218. The sample strobe is generated by the timing recovery/QM accumulation block 218 at each instant in time estimated to be the optimum sample time. The sampler samples the estimated optimum sample representing each symbol. By the time the sync word is ready to exit the shift register 214 an accurate estimate of the optimal timing has been achieved. Therefore, approximately sixteen symbol intervals after it is received, the digital data representative of the first sync symbol is output by the slicer/correlator circuit 230 on line 238.

As can be seen above, it is advantageous to avoid having to switch back from the second antenna to the first antenna because approximately two symbol intervals less time is available for timing recovery in this case. There is a statistical likelihood that the antenna selected to receive the previous burst will also be the better antenna for the subsequent burst. In order to reduce the probability of selecting the first antenna measured, the diversity controller 110 always makes the first RSSI measurement on the previously unused antenna, and makes the second RSSI measurement on the previously used antenna, thereby reducing the probability of having to switch back to the first antenna after measuring the other antenna.

Figure 4:
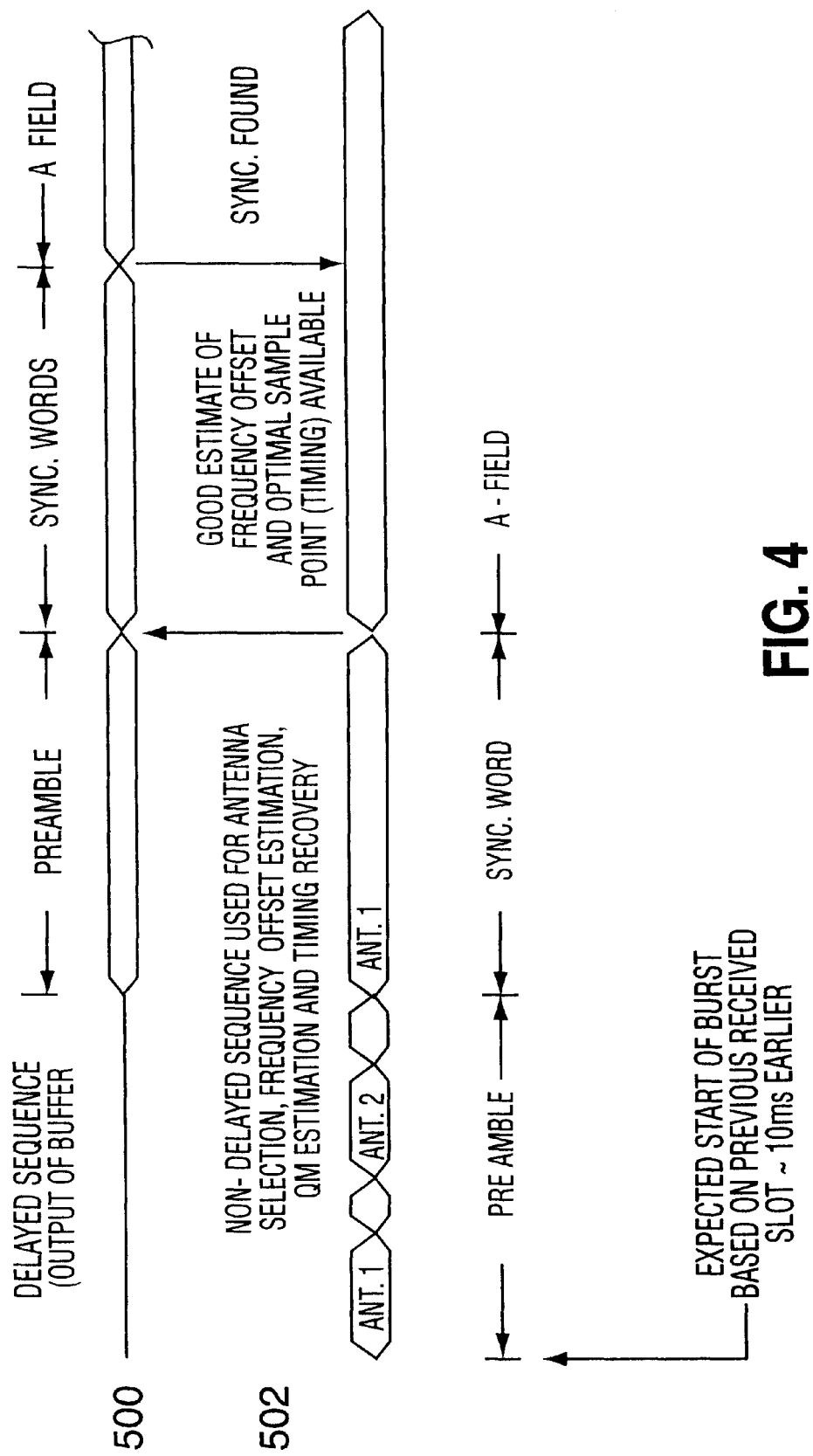
FIG. 4 is a timing chart for the receiver of FIG. 3.

FIG. 4 summarizes an example of the overall timing used to recover timing, synchronization, and to perform selection diversity with the above described system. Two sequences 500,502 are shown. Sequence 500 is the delayed sequence of samples at the output of the shift register/buffer 214. Sequence 502 is the non-delayed sequence. The preamble and sync periods of the non-delayed sequence are used to perform for antenna selection, frequency offset estimation, quality metric estimation, and timing recovery. In the example illustrated, a switch is made back to the first antenna at the end of the preamble sequence. At the end of the sync period of the non-delayed sequence, a good estimate of the optimal sample point (timing) is available together with a good estimate of the frequency offset for the selected antenna. At this time, the start of the sync word of the delayed sequence exits the buffer, and is available for sync detection. Synchronization is achieved at the end of the delayed sync word, and at this time the SYNC FOUND signal is generated thereby accurately locating in time the start of the A-field in the delayed sequence. The A-field can subsequently be successfully demodulated. While synchronization is being recovered in the delayed sequence, frequency offset and timing recovery can continue to be updated until sync is detected. Alternatively the timing recovery and frequency offset can be locked at a time based on an estimate of the end of the non-delayed sync sequence, the estimate being based upon a fixed number of bit intervals from the estimate of the beginning of the burst. The timing recovery circuit may be optimized for the known preamble and sync patterns. The particular locking mechanism could be made programmable.

FIG. 5a summarizes when the RSSI measurements and switches are performed for the case in which the second measured antenna has the better performance, and FIG. 5b summarizes when the RSSI measurements and switches are performed for the case in which the first antenna has the better performance. To begin the selection diversity process, the frequency offset correction block 216, the timing recovery/QM accumulation block 218 and the shift register/buffer 214 are all reset using signals on lines 215, 217, 220. In both cases, the measurements are started up to 1 $\mu$s prior to the estimate of the start of the burst to ensure that the start of the burst is included. In this example, the estimate of the start of the preamble including the 1 $\mu$s head start is 1 $\mu$s before the start of the burst. We refer to the intervals during the 1 $\mu$s head start as p−1. The sixteen symbol intervals of the preamble are labelled p0 to p15. During p−1 to p5, the first antenna is connected. A timing recovery histogram and quality metric for the first antenna are accumulated during this time, and an estimate of the frequency offset is made. At the end of this time, an ADC RSSI sample is captured by the diversity controller 110. During p6,p7 a switch to the second antenna is made. The frequency offset, timing histogram and quality metric are all saved in memory. During p8 to p13, a timing recovery histogram and quality metric for the second antenna are accumulated, and an estimate of the frequency offset is made. At the end of this time, an ADC RSSI sample is captured by the diversity controller 110. During P14, the ADC RSSI samples for the two antennas are compared, and the digital quality metrics are also compared if necessary. Based upon the two different metrics, at the end of P14, the better performing antenna is selected to receive the burst. In FIG. 5a the second antenna has the better performance, so no switch back to the first antenna is required during bits p15,p16, and the first timing histogram and frequency offset are not recalled from memory. In FIG. 5b, the first antenna has the better performance, and a switch back to the first antenna during p15,p16 is made. The timing histogram and frequency offset for the first antenna are recalled from memory. Timing recovery is then continued on the phase discriminated sync symbols as they are fed into the buffer, and a good estimate of the correct timing is attained before the sync word is ready to exit the buffer.

As discussed previously, software running on the microcontroller (not shown) may be equipped with an override function which allows the microcontroller to select an antenna based upon some other criterion such as link quality information. This may occur during call setup where the antenna selection system disables selection diversity until slot signal synchronization is achieved.

Figure 6:
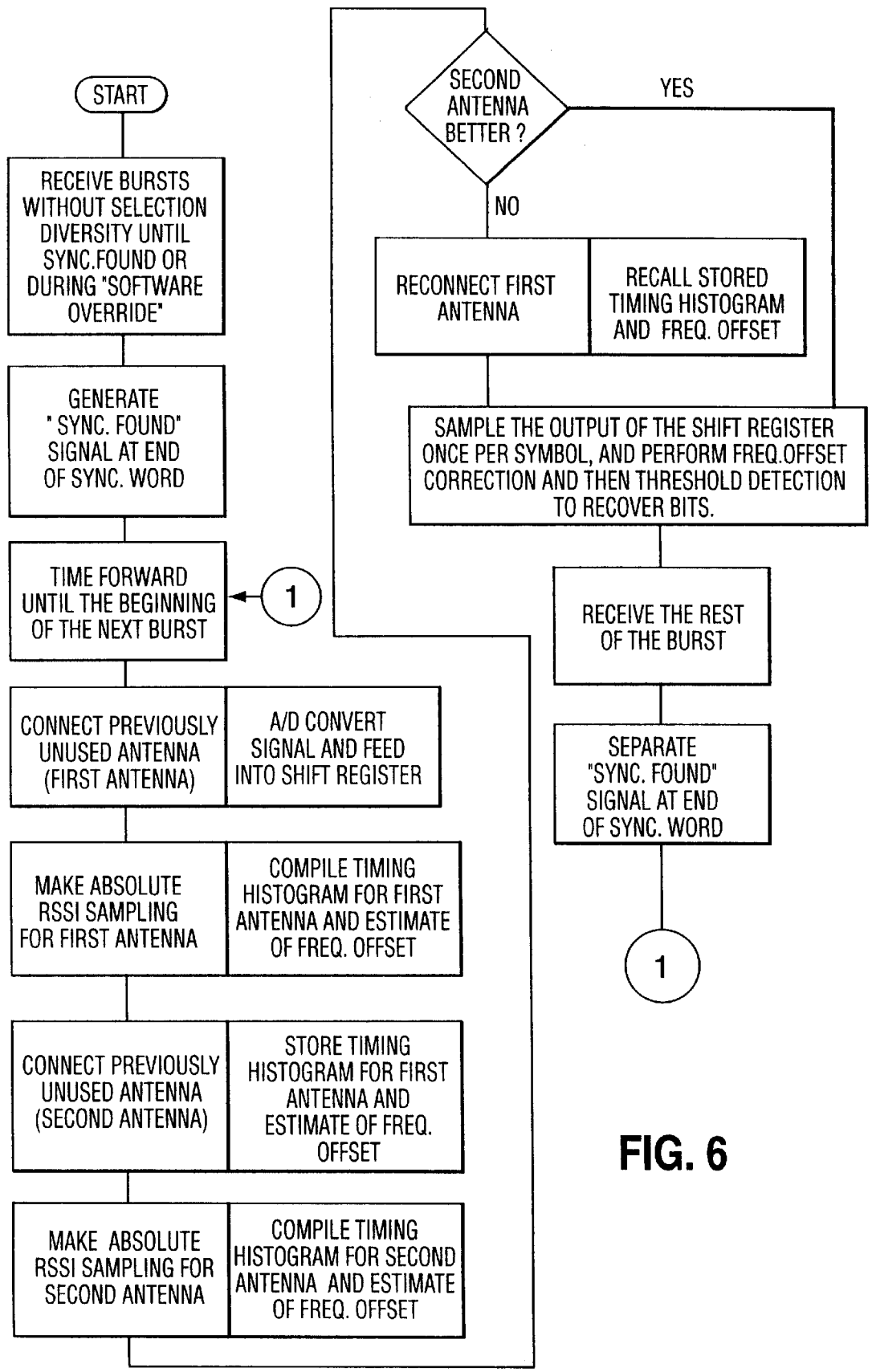
FIG. 6 is a flow chart for a selection diversity algorithm used in the invention.

The above described method of performing antenna selection diversity is summarized in FIG. 6 which shows an algorithm flowchart.

In the above, to simplify the explanation it has been assumed that the shift register 214 has a size which is large enough to delay the digitized representation of the signal until the diversity processing is completed. Nominally this delay may be made equal to the length of the sync word. However, in order for the timing and frequency offset information produced by the timing recovery/QM accumulation block 218 and the frequency offset correlation block 216 to be aligned with the output of the shift register 214 an additional delay must be added to the shift register equal to the delay introduced in the non-buffered signal stream as it passes through the two blocks 216, 218. It is important that the eight sample window at the output of the shift register 214 be located in time a multiple of eight samples from the same samples at the output of the timing recovery/QM accumulation block 218. This is necessary to ensure that when the timing recovery/QM accumulation block 218 produces a sample strobe for a particular sample in the eight sample window, samples of the shift register output are taken at the same sample in the eight sample window.

The selection diversity method has been described with reference to a single slot of a DECT TDMA frame. In the DECT TDMA case, the diversity controller can handle up to twelve simultaneous calls. The diversity controller could also be designed for half-slot operation in which case it could support up to 24 calls. The diversity controller needs enough memory and registers to keep track of the different sync offsets, modes of diversity etc. for each of the active calls.

In most cases, the base station in communication with a specific portable does not change between bursts. When a different base station becomes better than the present base station then a handover to that base station occurs. This occurs when a portable moves out of range of one base station and into range of another base station. The microcontroller can be programmed to provide "frequency adjustment" information to the portable and/or the new basestation to further reduce slicing errors and timing errors during handover. This is achieved by accessing the frequency offset information generated by the frequency offset correction block 216 and passing the necessary frequency correction information to the next basestation and to the portable via the signalling channel.

In another implementation of the invention, no feedback from a previous time slot is used. Instead, the incoming stream is buffered for a period just long enough to recover timing before the sync word exits the buffer notwithstanding the fact that only a crude estimate can be made of when the start of the preamble occurs. A larger buffer size is required in such an implementation. The buffer size should still be kept as small as possible to minimize delays in demodulating the received signal and to minimize hardware requirements.

Numerous modifications and variations of the present invention are possible in light of the above teachings. It is therefore to be understood that within the scope of the appended claims, the invention may be practised otherwise than as specifically described herein.

The example described above provides a method and apparatus for performing selection diversity at the base station. The same selection diversity may also be employed at the portables instead, or at both the portables and the base stations. Of course, a modified portable design would be required to perform the selection diversity at the portables.

The DECT standard allows transmit power to ramp-up as early as 10 μs prior to the first bit of the preamble. Depending on how the portable manufacturer utilizes this power ramp interval, it is possible that it may be effectively used as a "hidden" extension of the preamble. This would allow more time to perform the selection diversity. The use of this "hidden" extension of the preamble further enhances the performance by allowing additional time for RSSI measurements and clock recovery. All portables contain a finite amount of power ramp-up time prior to the first bit transmitted to ensure they are at full power for the first bit of the preamble. Utilization of this power ramp-up time to perform diversity functions at the base station would require that the portables be qualified for use with specific base station products. Given this qualification, diversity timing parameters may be optimized during call setup based on the known characteristics of the portable type which are stored in a table which is consulted during call setup upon reception of the portable ID (PID). Alternatively, the diversity controller in combination with the microcontroller could control RSSI measurements earlier than predicted by the "Sync Found" to iteratively determine the power ramp profile of the portable and then adjust the diversity timing to take advantage of any early power up. This would be done prior to selection diversity as part of the call setup procedure but after slot synchronization has been initially detected.

In the above described embodiments a form of digital demodulation has been used in which only a single sample of eight taken for each symbol is used. Other more elaborate but well known techniques exist. For example, all of the samples of a given symbol may be combined according to a weighting scheme with threshold detection being performed on the combined value.

In the embodiments described above, a particular method of recovering timing has been described but other methods may be used provided they recover timing by the time the SYNC word exits the buffer.

In the above description, two or more spaced antennas are used at the input to achieve spatial diversity, and the invention has provided methods and systems for selecting which of the spaced antennas to use. The invention can also be applied to other forms of diversity. For example, to achieve two-fold diversity, two antennas having orthogonal polarizations may be used or a single antenna having two selectable orthogonal polarizations may be used. In general, the invention provides methods and systems for selecting which of several possible antenna channels to use to receive a burst, and this is independent of the particular antenna scheme used. When two or more selectable antennas are referred to, this is not intended to exclude two or more antenna channels implemented with a single physical apparatus.

In the above described embodiment, an oversampling rate of 8 samples per symbol with a digital resolution of 5 bits per sample is used. Other oversampling rates and digital resolutions may be used.

In the above described embodiment, a frequency offset is saved after capturing a digital RSSI measurement for the first antenna, and a new estimate of frequency offset is developed for the second antenna. An alternative option is to continue building the first estimate of the frequency offset while connected to the second antenna, holding the estimate during any switching transients.

While in the embodiments described, a storage buffer which is a shift register or buffer has been used to delay the digitized $\Delta\phi$ signal, any appropriate type of storage buffer could be used.

No extended preamble is required to implement the above described embodiments of the invention, but if an extended preamble is available, it could be utilized to enhance timing recovery, frequency offset estimation, and antenna performance measurements thereby improving the overall burst receive performance.

We claim:

1. A TDMA (time division multiple access) radio receiver for receiving bursts including a previous burst and a present data burst both from a particular transmitter between which there are bursts from other transmitters each burst having a plurality of symbols divided into a preamble, a sync word and a data field, the receiver comprising:

a) a plurality of alternatively connectable antenna channels;
   b) a digital demodulator for digitally demodulating the previous burst before recovery of the sync word to produce a demodulated bit stream;
   c) a sync word demodulator for searching for the sync word in the demodulated bit stream and generating an indication that the sync word has been received in the previous burst;
   d) a timer for measuring forward in time from detection of the sync word of the previous burst to provide an estimate of the beginning of the preamble of the present burst;
   e) an antenna channel selector for controlling which of the plurality of antenna channels is connected and for making performance measurements, during reception of the preamble for the present burst the antenna channel selector connecting the plurality of antenna channels in turn and making a performance measurement for each antenna channel and after all the performance measurements are made the antenna channel selector connecting to the receiver the antenna channel with the best performance measurement, the first performance measurement being made during a period having a start time related to the estimate of the beginning of the preamble of the present burst.

2. A receiver according to claim 1 wherein each of said antenna channels is part of a separate antenna.

3. A receiver according to claim 1 wherein said antenna channels are part of a single antenna apparatus.

4. A receiver according to claim 1 wherein said plurality of alternatively connectable antenna channels comprises two physically spaced antennas.

5. The receiver of claim 1 wherein the performance measurement is a digitized RSSI (received signal strength indicator) measurement.

6. A receiver according to claim 1 wherein said plurality of antenna channels comprises two orthogonally polarized antenna channels.

7. The receiver of claim 1 wherein the performance measurement is a digitized RSSI measurement combined with a digital quality metric taken on the digital samples.

8. The receiver of claim 1 wherein the antenna channel selected to receive a burst is also used by an associated transmitter to transmit a subsequent burst.

9. The receiver of claim 1 wherein the last antenna channel measured is the antenna channel last connected to during the previous burst.

10. A receiver according to claim 1 further comprising means for performing switch diversity, and a switch for switching between selection diversity and switch diversity.

11. The receiver of claim 1 wherein the digital demodulator comprises:
an analog to digital converter for making M digital samples of each symbol, each digital sample containing N bits, where M>0, and N>0; and
slicing means for performing threshold detection on a selected digital sample of each symbol thereby producing a demodulated signal consisting of an estimate of the received data burst.

12. The receiver of claim 11 wherein the digital demodulator further comprises:
a frequency offset-correction circuit to remove any effects of frequency offset from each said optimal sample.

13. The receiver of claim 11 further comprising:
timing recovery circuitry for selecting the selected digital sample for each symbol.

14. The receiver of claim 11 wherein N=5 and M=8.

15. A TDMA (time division multiple access) radio receiver for receiving data bursts each having a plurality of symbols divided into a preamble, a sync word and a data field, the receiver comprising:
a) a plurality of alternatively connectable antenna channels;
b) digital demodulation means for digitally demodulating the received data burst before recovery of the sync word;
c) sync word detection means for searching for the sync word in a demodulated bit stream and generating an indication that the sync word has been received in a previous burst;
d) timing means for measuring forward in time from reception of the sync word of the previous burst to provide an estimate of the beginning of the preamble of a present burst;
e) selection means for controlling which of the plurality of antenna channels is connected and for making performance measurements, the selection means connecting the plurality of antenna channels in turn and making a performance measurement for each antenna channel and after all the performance measurements are made the selection means connecting to the receiver the antenna channel with the best performance measurement, the first performance measurement being made during a period having a start time related to the estimate of the beginning of the preamble of the present burst;
storage buffer means connected to an output of the analog-to-digital converter means, the storage buffer means being large enough to delay the digital samples of the received burst long enough to allow antenna selection without corrupting the detection of sync;
wherein the digital demodulator means comprises:
analog to digital converter means for making M digital samples of each symbol, each digital sample containing N bits, where M>0, and N>0; and
slicing means for performing threshold detection on a selected digital sample of each symbol thereby producing a demodulated signal consisting of an estimate of the received data burst.

16. The receiver of claim 15 wherein the demodulation means further comprises:
a digital quadrature mixer and a phase discriminator connected between the analog to digital converter and the shift register.

17. A TDMA (time division multiple access) radio receiver for receiving bursts each having a plurality of symbols divided into a preamble, a sync word and a data field, the receiver comprising:
a) a plurality of alternatively connectable antenna channels;
b) digital demodulation means for digitally demodulating the received data burst before recovery of the sync word;
c) sync word detection means for searching for the sync word in a demodulated bit stream and generating an indication that the sync word has been received in a previous burst;
d) timing means for measuring forward in time from reception of the sync word of the previous burst to provide an estimate of the beginning of the preamble of a present burst;
e) selection means for controlling which of the plurality of antenna channels is connected and for making performance measurements, the selection means connecting the plurality of antenna channels in turn and making a performance measurement for each antenna channel and after all the performance measurements are made the selection means connecting to the receiver the antenna channel with the best performance measurement, the first performance measurement being made during a period having a start time related to the estimate of the beginning of the preamble of the present burst;
wherein the digital demodulator means comprises:
analog to digital converter means for making M digital samples of each symbol, each digital sample containing N bits, where M>0, and N>0;
slicing means for performing threshold detection on a selected digital sample of each symbol thereby producing a demodulated signal consisting of an estimate of the received burst;

timing recovery means for selecting the selected digital sample for each symbol;

wherein said timing recovery means compiles a histogram value for each of the M samples over many digital samples, and selects a sample corresponding to the maximum histogram value as the selected digital sample.

18. The receiver of claim 16 wherein the maximum value in said timing histogram is used as a quality metric, and wherein in the case that the performance measurements differ by less than a predetermined amount, a comparison of the quality metrics of the antenna channels is made, and the antenna channel having the best quality metric is selected.

19. The receiver of claim 16 wherein said plurality of antenna channels comprises a first antenna channel and a second antenna, and said timing recovery means compiles a first histogram while connected to said first antenna channel saves the first histogram, and compiles a second histogram while connected to said second antenna.

20. A TDMA (time division multiple access) radio receiver for receiving data bursts each having a plurality of symbols divided into a preamble, a sync word and a data field, the receiver comprising:

a) a plurality of alternatively connectable antenna channels;

b) selection means for controlling which of the plurality of antenna channels is connected and for making performance measurements, the selection means connecting the plurality of antenna channels in turn and making a performance measurement for each antenna channel and after all the performance measurements are made the selection means connecting to the receiver the antenna channel with the best performance measurement, the first performance measurement being made during a period having a start time related to the estimate of the beginning of the preamble of the present burst;

c) analog to digital converter means for making M digital samples of each symbol, each digital sample containing N bits, where M>0, and N>0;

d) digital demodulation means for digitally demodulating selected digital samples of the received data burst;

e) timing recovery means for selecting the selected digital samples which represent received symbols; and f) storage buffer means connected to an output of the analog-to-digital converter means, the storage buffer means being large enough to delay all the digital samples of the received burst just long enough to allow antenna selection to be completed without corrupting the demodulation of the sync word.

21. The method of claim 20 further comprising the steps of:

i) making M digital samples of each symbol, each digital sample containing N bits, where M>0, and N>0;

j) storing the digital samples in a storage buffer means large enough to delay the received data burst long enough to perform selection diversity without corrupting sync detection;

k) digitally demodulating an output of the storage buffer means to produce a demodulated signal consisting of an estimate of the received data burst the step of digitally demodulating including the steps of:

i) recovering timing by selecting for each symbol an optimal one of said M digital samples for threshold detection;

ii) compensating for any effects of frequency offset in each said optimal digital sample;

iii) converting an output of the frequency off-set correction means into said estimate of the received data burst.

22. The method of claim 21 wherein during a handoff between a first TDMA receiver and a second TDMA receiver, frequency offset information is passed to the second TDMA receiver.

23. The method of claim 21 wherein during a handoff between a first TDMA receiver and a second TDMA receiver, frequency offset information is transmitted to the source of the burst.

24. An antenna channel selection method for use in a TDMA radio receiver having first and second alternatively connectable antenna channels for receiving bursts each having a plurality of symbols divided into a preamble, a sync word and a data field, the antenna channel selection method comprising the steps of:

a) determining when a sync word for a previous burst from a particular transmitter has been received;

b) measuring forward in time from the reception of the sync word of a previous burst to provide an estimate of the beginning of the preamble of a present burst from the particular transmitter;

c) connecting the first antenna;

d) measuring a first performance measurement for the first antenna channel during a first time interval having a start time related to the estimate of the beginning of the preamble of the present burst;

e) connecting the second antenna channel during a second time interval following said first time interval;

f) measuring a second performance measurement for the second antenna channel during a third time interval following said second time interval;

g) comparing the first performance measurement and the second performance measurement to determine which performance measurement is better; and h) reconnecting the first antenna channel if the first performance measurement is better.

25. The method of claim 24 wherein the performance measurement is a digitized RSSI (received signal strength indicator) measurement in combination with a digital quality metric taken on digital samples of said symbols.

26. The method of claim 24 wherein the second antenna channel is the antenna channel last connected during the previous burst.

27. The method of claim 24 further comprising the step of iteratively determining a power ramp profile and adjusting the start time to take advantage of any early power up.

28. The method of claim 24 further comprising the steps of receiving a PID (potable identification number) during call setup, looking up in a table power ramp characteristics for that PID, and adjusting the diversity timing to take advantage of any early power up.

29. A method according to claim 24 further comprising the step of i) buffering the received sampled data burst long enough to perform selection diversity without corrupting sync detection.

30. A method according to claim 24 wherein M=8 and N=5.

\* \* \* \* \*